United States Patent

Salloum

[15] 3,672,517

[45] June 27, 1972

[54] ROTARY VEHICLE PARKING SYSTEM WITH RAMP AND TURNTABLE ARRANGEMENT

[72] Inventor: Charles R. Salloum, 120 Ellis St., San Francisco, Calif. 94102

[22] Filed: April 1, 1970

[21] Appl. No.: 24,699

Related U.S. Application Data

[63] Continuation-in-part of Ser. No. 750,952, April 12, 1968, Pat. No. 3,613,909.

[52] U.S. Cl. .....................................................214/16.1 A
[51] Int. Cl. .........................................................E04h 6/06
[58] Field of Search ...............................214/16.1 R, 16.1 A

[56] References Cited

UNITED STATES PATENTS

| 1,528,893 | 3/1925 | Rother | 214/16.1 |
|---|---|---|---|
| 2,316,034 | 4/1943 | Warren | 214/16.1 |
| 2,631,743 | 3/1953 | Hornick | 214/16.1 |

FOREIGN PATENTS OR APPLICATIONS

| 1,224,052 | 2/1960 | France | 214/16.1 |
|---|---|---|---|
| 979,606 | 1/1965 | Great Britain | 214/16.1 |
| 1,047,448 | 11/1966 | Great Britain | 214/16.1 |

*Primary Examiner*—Robert G. Sheridan
*Assistant Examiner*—R. B. Johnson
*Attorney*—Gregg & Hendricson

[57] ABSTRACT

A multilevel parking system employing rotary parking platforms for maximized parking density and particular ramp and turntable arrangements for simplified access and egress with improvement economy of construction.

7 Claims, 6 Drawing Figures

PATENTED JUN 27 1972

INVENTOR
CHARLES R. SALLOUM
BY Gregg & Henderson
ATTORNEYS

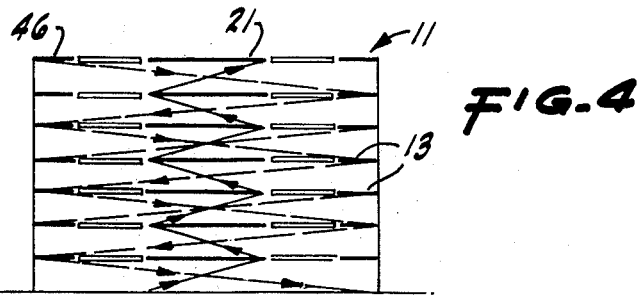
FIG. 4
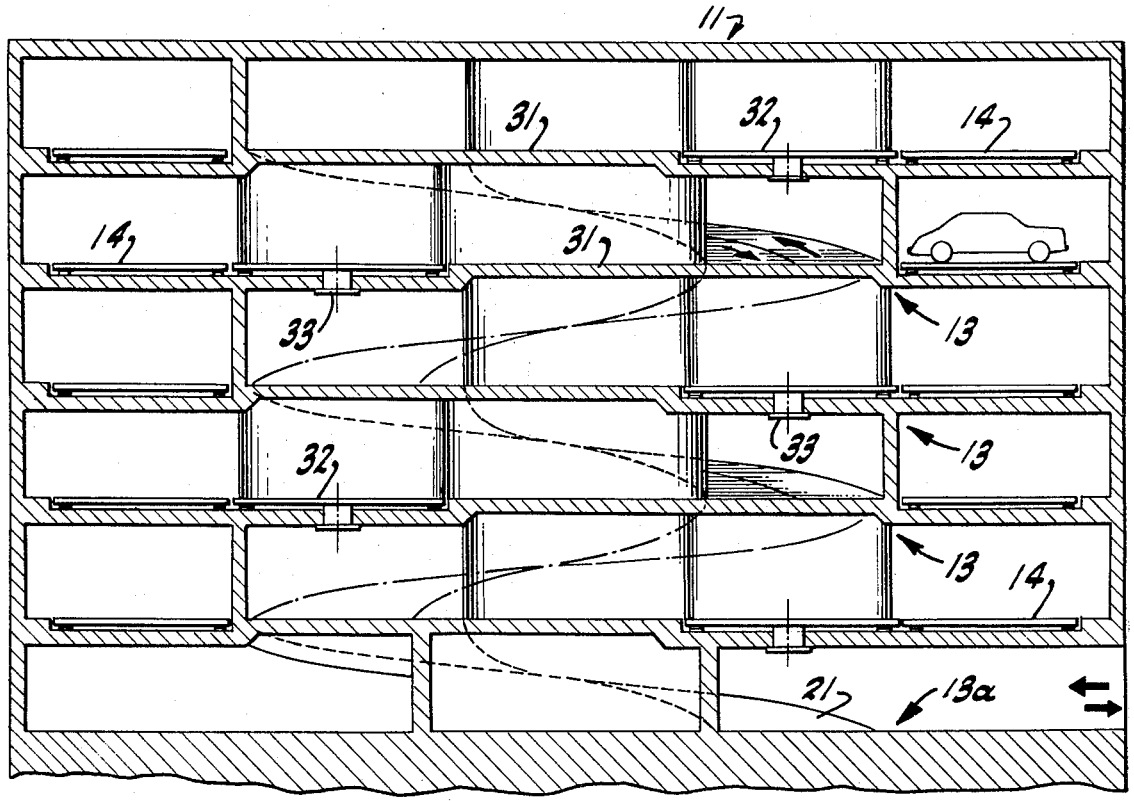
FIG. 2
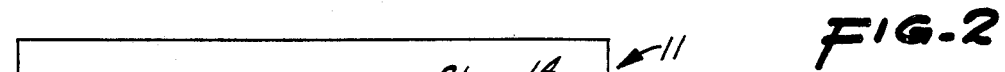
FIG. 3
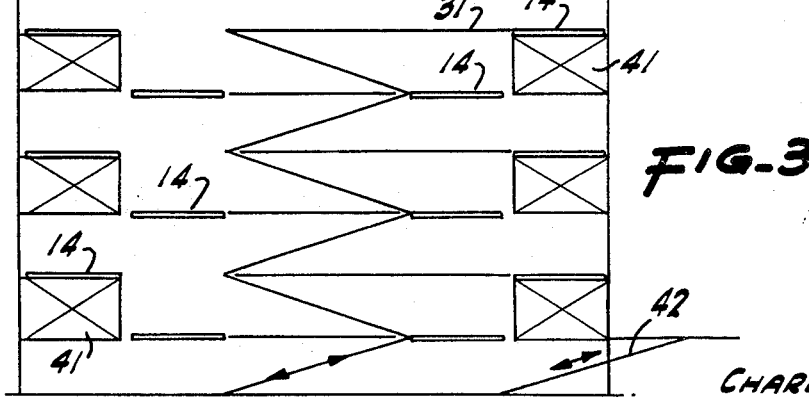
INVENTOR
CHARLES R. SALLOUM
By Gregg Hendricson
ATTORNEYS

ROTARY VEHICLE PARKING SYSTEM WITH RAMP AND TURNTABLE ARRANGEMENT

This application is a continuation-in-part of my copending U.S. Pat. application Ser. No. 720,952 filed in the U.S. Patent Office on Apr. 12, 1968, now U.S. Pat. No. 3,613,909.

BACKGROUND OF INVENTION

It is well recognized that the concentration of population in urban areas and the popularity of automotive vehicles has given rise to serious problems in connection with vehicle movement and parking. Significant advances have been made in the construction of freeways and the like to counteract the problems of vehicle movement, however, conventional approaches to the problem of vehicle parking have proven inadequate. The parking of vehicles upon city streets adds to the congestion while limiting the area available for vehicle movement, and so-called "offstreet" parking has been generally accepted as necessary. In order to park a large number of vehicles in this small ground area, there have been constructed parking garages and large numbers of these are now in use and more are projected for future construction.

Particularly in large cities, the substantial cost of land requires maximum utilization thereof. Thus parking garages as they are often termed, are required to handle a maximum number of vehicles per floor in order to be economically feasible. One highly advantageous solution to the high density parking of vehicles is to be found in the rotary parking platform such as described in my prior U.S. Pat. Nos. 3,378,151 and 3,382,990. These above-noted patents set forth practical improvements in parking garages, however, it is noted for certain applications it is desirable to minimize costs of construction which is not compatible with the utilization of elevators for access and egress. On the other hand conventional structures employing ramps for the movement of vehicles between parking levels fail to maximize the number of vehicles that can be parked on a particular level or fail to provide for rapid filling and emptying of the levels.

The present invention provides an improved vehicle parking system utilizing rotary parking platforms for attaining maximized parking density while permitting rapid access to all parking stalls combined with ramp arrangements and vehicle turntables to facilitate movement of vehicles into and out of parking locations.

SUMMARY OF INVENTION

There is provided by this invention a system of vehicle parking including one or more rotary mounted annular parking platforms upon which vehicles are adapted to be radially disposed. The platform or platforms are power driven so as to rapidly locate any parking stall thereof in position for ready vehicle ingress or egress. It is furthermore provided herein that vehicle movement between parking levels shall be accomplished by traverse upon one or more spiral ramps with cross ways or bridges leading therefrom to separate levels and preferably incorporating vehicle turntables for proper vehicle orientation so as to preclude the backing of vehicles during the parking operation.

The invention furthermore provides for the staggering of rotary mounted platforms at different levels to the end of minimizing overall volume and in desired circumstances providing other utility to the structure. Many office buildings and the like are required to incorporate parking facilities therein and the present invention is particularly well adapted to this application particularly with regard to the staggered configuration of parking locations provided herein. In the instances wherein the present system is constructed separately from other facilities there is incorporated appropriate pedestrian walkways and vertical movement means such as for example escalators or elevators.

DESCRIPTION OF FIGURES

The present invention is illustrated as to particular preferred embodiments thereof in the accompanying drawings wherein:

FIG. 2 is a schematic elevational view of the parking structure of FIG. 1 taken in a central vertical plane 2—2 of FIG. 1 and illustrating the internal ramp arrangement in combination with the rotary parking platforms;

FIG. 3 is a line diagram illustrating in elevation a variant of the structure of FIGS. 1 and 2;

FIG. 4 is a line diagram illustrating in elevation a further variant of the structure of FIGS. 1 and 2;

DESCRIPTION OF PREFERRED EMBODIMENTS

Figure 1:
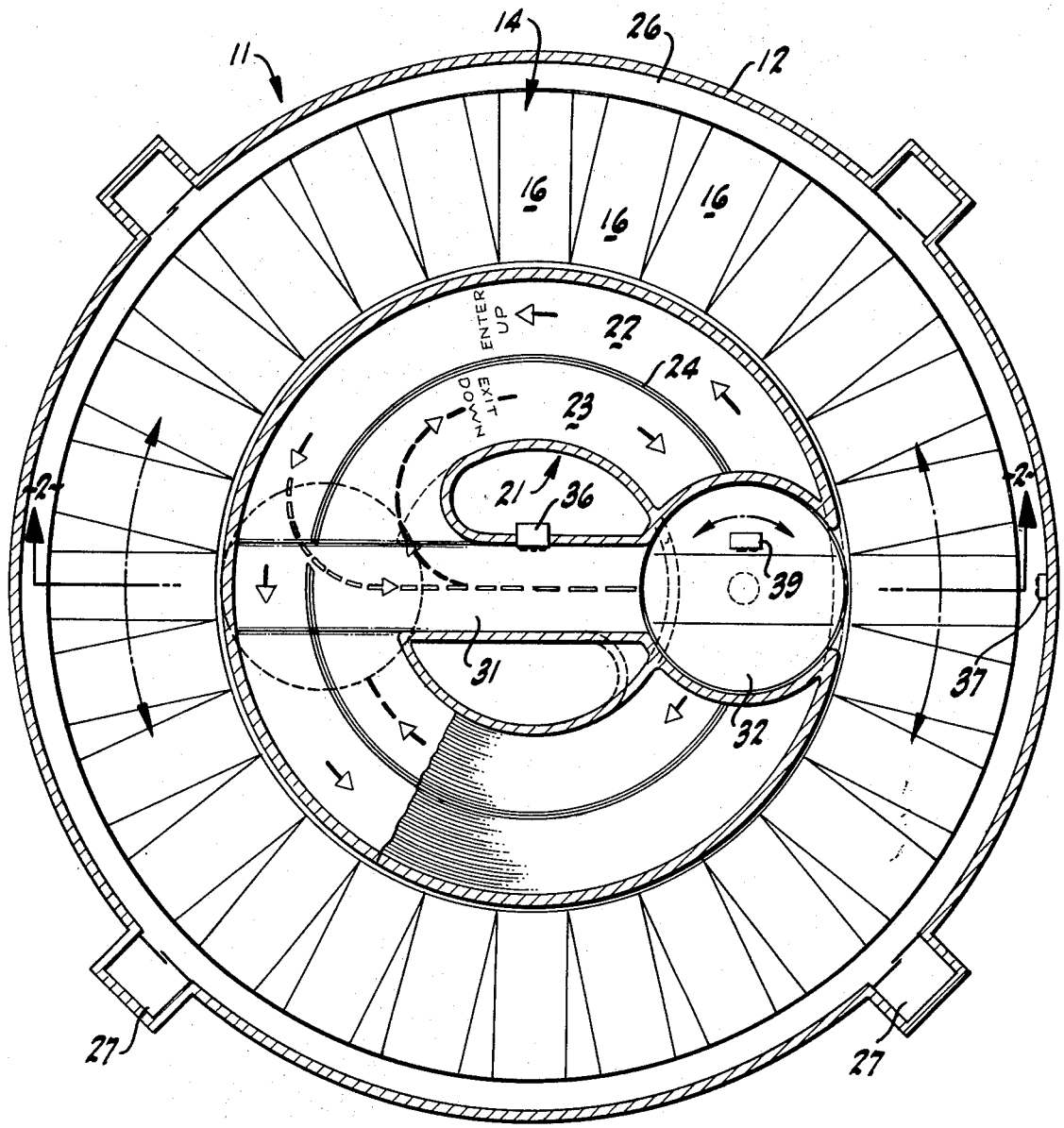
FIG. 1 is a schematic plan view of a parking structure with the top floor removed and formed in accordance with the present invention.

Considering first the illustrations of FIGS. 1 and 2, there will be seen to be shown a structure 11 which may for example have a circular outer wall 12 and defining a plurality of vertically spaced parking levels 13. At each level there is provided a single rotary-mounted parking platform 14 having a plurality of radially disposed parking stalls 16 thereon, as best seen in FIG. 1. Each of the parking platforms 14 are adapted to be motor driven by means not shown to position the parking stalls 16 thereon at desired rotary positions within the structure 11 for reasons discussed below.

The present invention provides for access to the separate parking levels 13 from an entrance and exit 13a by means of a central spiral ramp 21 extending vertically through the structure 11 interiorly of the parking platforms 14. This ramp 21 is shown in FIG. 1 to be divided radially into separate entrance and exit portions 22 and 23 preferably with a wall 24 therebetween. It will be appreciated that the overall structure 11 is appropriately dimensioned so that the up and down ramps 22 and 23 have appropriate widths for the passage of vehicles therealong and also so that the ramp curvature is appropriate for vehicle travel thereon. With regard to the dimensioning of the parking platforms 14 it is noted that the radial depth thereof is slightly in excess of the overall length of vehicles to be parked thereon. Exteriorly of the parking platforms 14 there are provided annular walkways 26 extending about the exterior of each floor and providing communication between the parking platforms and passenger elevators 27 spaced about the exterior of the structure.

Considering further the movement of vehicles between the entrance or exit level 13a and parking levels, it is noted that each level is provided with a central horizontal vehicle cross over or bridge 31 extending from the ramp 21 at such level across the center of the level to the parking platform 14 on the opposite side of the level. There is also preferably provided on the opposite side of the cross over 31 from the ramp 21 a vehicle turntable 32 immediately adjacent the parking platform at such level. While such turntable is not absolutely necessary it is highly advantageous in facilitating the movement of vehicles within the parking structure. This is discussed further below in connection with operation of the invention. However, at this point it is further noted that it is possible for such turntable 32 to be physically located on the ramp 21 at the cross over 31 of each parking level. While such a turntable location is suitable for vehicle movement it is somewhat less advantageous from the view point of turntable wear and also ramp closure during turntable operation. Each of the turntables 32 are power driven as by means schematically illustrated at 33 of FIG. 2.

Further to the embodiment of the present invention illustrated in FIGS. 1 and 2 it is noted that means are provided for controlling the rotary position of the parking platforms 14 at each floor or parking level. Such means are schematically illustrated at 36 of FIG. 1 as comprising a control panel located upon the cross over 31 and readily accessible to the operator of a vehicle passing over this cross over. It is of course to be recognized that the rotary position of each parking platform may be remotely controlled from a master or control station or alternatively that the operator of a vehicle may himself control the rotary position by the control panel 36 prior to parking upon the platform. Similarly control means 37 are provided for example at the annular walkway 26 for rotary indexing of the parking platform 14 by one who desires to remove a vehicle from the platform area. These control means 37 are similarly operable to rotate the platform for disposing any desired parking stall 16 in alignment with the cross over 31 in order for a vehicle to be removed from the platform and driven down the exit ramp 23 to leave the structure. Details of the control means are not included herein inasmuch as they may be relatively conventional and furthermore are described in my above-noted patents. Similarly details of the individual parking platforms are not set out herein as they also are described as to various embodiments thereof in my above-noted patents. It is only briefly noted that suitable vehicle retention means such as for example shallow wheel depressions may be provided in the stalls of the rotary platforms to ensure that no movement of the vehicle parked thereon may occur unintentionally. Also it is noted that parking meters may be provided at each parking stall, also as described in my above-noted patents.

Considering now the operation of the embodiment of the present invention as illustrated in FIGS. 1 and 2 it is noted that the entrance level 13a may for example comprise the ground floor of the structure 11 or alternatively may be located below ground with a ramp leading down to same from street level. A vehicle entering the structure on the entrance level 13a may be provided with a parking ticket at a control station, with such ticket indicating the level upon which the vehicle is to be parked. The operator then drives the vehicle up the ramp 21 along the entrance side 22 thereof to the appropriate level such as the one illustrated in FIG. 1. The operator then turns the vehicle from the up ramp 22 onto the cross way 31 as indicated by the dashed line and arrow of FIG. 1. The operator may stop the vehicle in the center of the cross over 31 and by means of the control panel 36 index the rotary platform 14 to present an empty stall 16 directly ahead of the vehicle. This indexing is accomplished by rotary movement of the platform 14 through drive means, not shown. The operator may then directly drive the vehicle into the open or empty parking stall aligned with the cross over 31 and leave his vehicle to depart from the building along the walkway 26 and an elevator 27 leading to the ground floor. Upon return the operator may gain access to the appropriate floor upon which his vehicle is parked by means of one or the elevators 27 and there operate the control means 37 to rotate the platform 14 into a position wherein his automobile is again aligned with the cross over 31. The operator then may back his automobile onto the turntable 32 and rotate the turntable to reverse the direction of his car. Such control over the turntable movement may be provided for example by control means 39 provided upon the turntable or depending from the ceiling above same. Alternatively it is possible for the turntable to automatically operate in response to the passage of the vehicle from the rotary platform onto the turntable. The vehicle is then directed to the left in FIG. 1 and may be driven over the cross over 31 and turned, as indicated by the dashed line and arrows in FIG. 1, onto the exit portion 23 of the ramp 21. The vehicle is then driven down the ramp to the entrance and exit level 13a whereat the parking ticket may be presented to an operator for release of the vehicle to be driven out of the parking structure 11. It will be appreciated that the turntable 32 may be employed to reverse the direction of the vehicle either immediately prior to movement of same onto the parking platform 14 or immediately after removal of same from this platform. In either case the vehicle is reoriented so as to be readily driven down the exit portion 23 of the ramp 21.

The parking system described above is illustrated as a structure extending above ground level, however, it may be inverted to extend below ground level. In this case the entrance and exit portions of the ramp 21 may be reversed or at least turns are modified to afford proper turning radius. It is also noted that the stalls 16 on the rotary platforms 14 may also be employed for storage of goods or the like rather than vehicles and access thereto provided by one or more vehicles of some sort moving along the paths identified above.

Various modifications of the embodiment of the invention described above are possible and thus for example referring to FIG. 3 it will be seen to be shown the same basic system as described above but providing for radially staggered rotary parking platforms 14. Thus the parking platform on one floor is disposed radially inward of the parking platform on adjacent floors and vice versa to the end of providing within the overall structure 11 open spaces or volumes 41 which may be employed as offices or the like. For this structure it is only necessary to expand the lateral dimensions of the structure or building and to extend the central bridges or the like 31 in alternate floors to reach the outwardly disposed parking platforms on such levels. There is also shown in FIG. 3 the provision of an entrance ramp 42 leading from a ground or street level to a basement entrance and exit level.

A further possible modification of the present invention is schematically illustrated in line diagram in FIG. 4 wherein there are provided a multiplicity of vertically spaced parking levels 13 with a central spiral ramp 21, in this instance employed only for vehicle movement in one direction such as upwardly as indicated by the arrows in the drawings. This embodiment of the invention which may be employed under certain circumstances generally related to land use incorporates an exterior spiral ramp 46 which it utilized only for vehicle traverse in a single direction such as downwardly as indicated by the arrows in the drawing. Thus in this embodiment the vehicles move inwardly to a central ramp and upwardly thereon to the appropriate or desired parking level and are removed from such level by movement radially outward into the upward ramp 46 and thence downwardly thereon to the entrance and exit levels.

Figure 5:
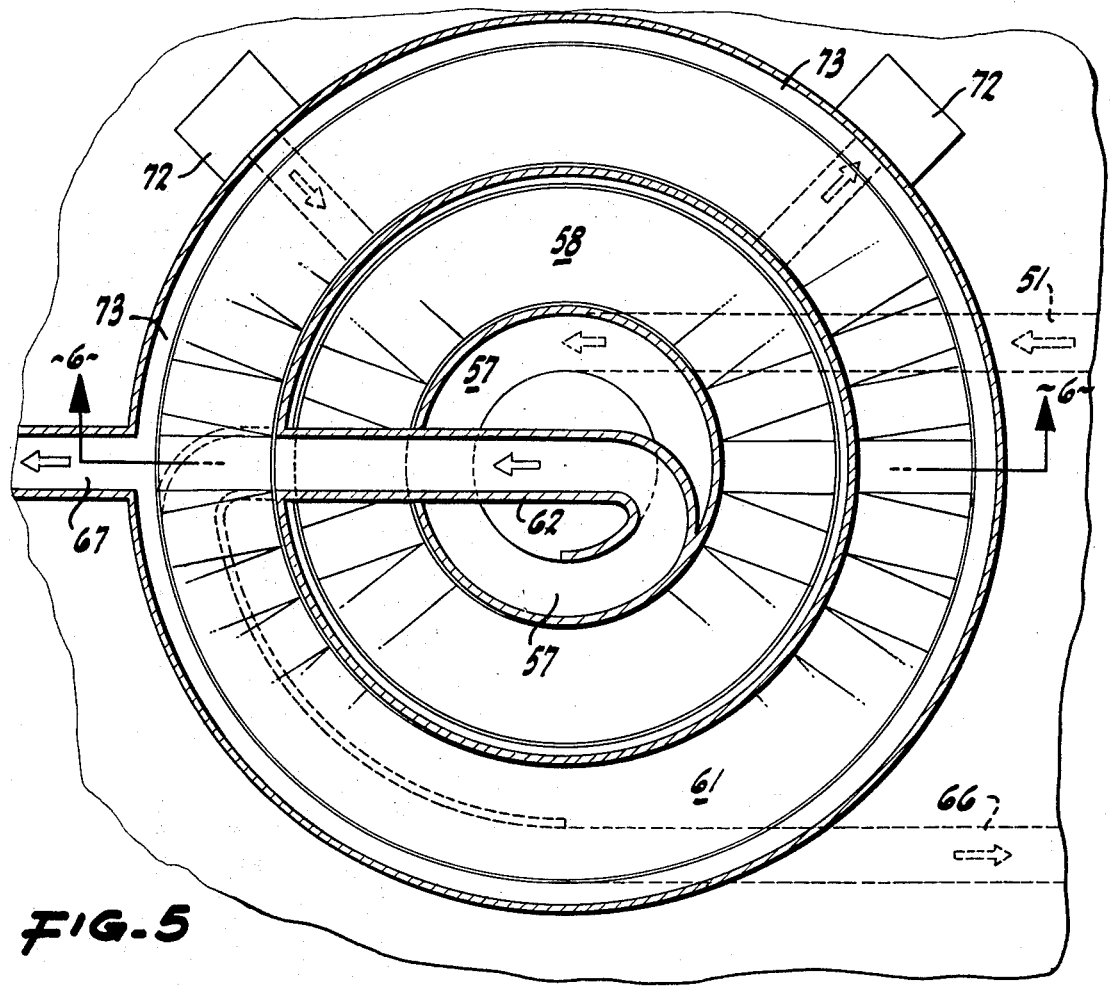
FIG. 5 is a schematic illustration in plan view of a parking lot in accordance with the present invention.
Figure 6:
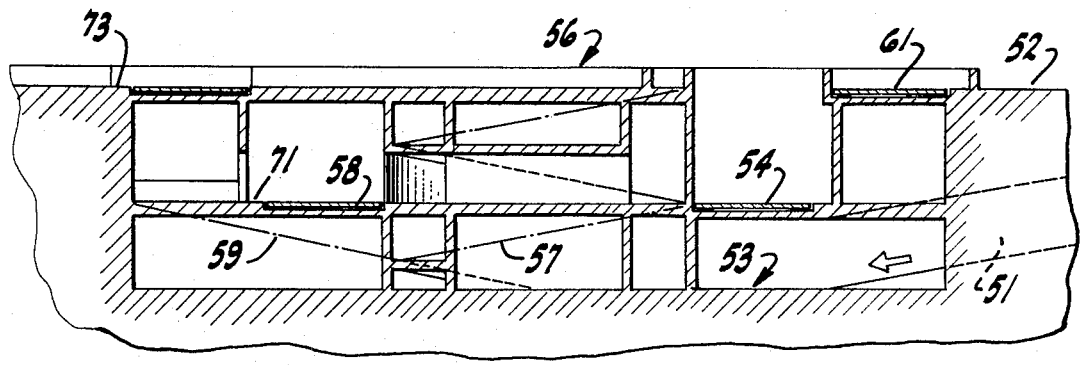
FIG. 6 is a schematic elevational view of the parking lot taken in the central vertical plane 6—6 of FIG. 5.

A further embodiment of the present invention particularly adaptable to what may be termed a parking lot is shown in FIGS. 5 and 6. This embodiment of the present invention provides for an exterior ramp 51 extending downwardly from street level 52 to a sub-basement or bottom level 53 which may either be utilized for parking or possibly vehicle servicing. Above this lower level 53 there is provided a basement parking level 54 and upwardly therefrom a top parking level 56 even with the street level 52. The second parking level 54 is provided with a rotary parking platform 57 located radially outward and immediately adjacent a central spiral ramp 58 extending upwardly from the lower platform 53 through the middle of the unit to the upper parking platform 56. The ramp 57 communicates directly with the rotary parking platform 58 of the second or intermediate level 54 of the unit and thus vehicles may be driven directly onto the separate parking stalls of such platform. There is furthermore provided a second exteriorly disposed ramp 59 extending from the central level 54 downwardly to the lower level 53. This ramp is disposed radially outward of the parking platform 58 of the central level and thus vehicles located on this parking platform 58 and pointed outwardly may be driven radially outward and thence down the ramp 59 so as to require no backing nor rotation to reverse direction thereof. At the upper level 56 there is also provided a rotary parking platform 61 similar to those described above but in this instance located radially outward of the platform 58 on the level below. The ramp 57 extends in a spiral fashion upwardly to terminate at the upper parking level 56 as indicated in FIGS. 5 and 6. At this upper level there is provided a cross way or bridge 62 extending from the upper end of the ramp on the right side of the structure as viewed in the figures diametrically across the upper level to terminate at the inner edge of the upper parking platform 61.

The structure briefly described above and schematically illustrated in FIGS. 5 and 6 is particularly adaptable to a three level unit such as might be employed in place of a conventional parking lot and requiring no structure above ground. Vehicles enter the exterior ramp 51 into the lower level 53 where they could for example be conventionally parked or possibly serviced. From the lower level vehicles are driven upwardly on the single lane interior ramp 57 either to the intermediate level 54 or upper level 56. At the intermediate level 54 vehicles may be driven from the ramp radially outward into an empty stall of the rotary platform 58. This rotary platform 58 is provided with drive means, not shown, so that it may be indexed by rotary motion to successively place empty stalls in position to accept the next vehicle arriving. Should the vehicle be driven further upwardly to the top level 56 it would then be driven across the bridge 62 and driven onto an empty stall of the top rotary platform 61. This upper platform 61 is also provided with drive means, not shown, for rotary motion to locate any desired stall in alignment with the bridge or cross way 62. It will be seen that a vehicle parked on either of the rotary platforms 58 or 61 are directed radially outward thereof. Control means may be provided at each parking level for rotary indexing of the parking platforms.

With regard to the removal or egress of vehicles from the parking unit of FIGS. 5 and 6 there are provided control means not shown for rotating the platform 58 to align a desired stall thereof with the upper end of the exit ramp 59. A vehicle may be driven from platform 58 down the ramp 59 to the lower level 53 and thence back to street level, as along an upwardly directed exit ramp 66. A vehicle parked on the upper rotary parking platform 61 is also directed outwardly thereof and thus for removal of the vehicle it is only required that the platform 61 be rotated to align the stall carrying the vehicle with an exit driveway 67 leading to a street or the like.

It will be seen that the parking unit of FIGS. 5 and 6 briefly described above provides for a smooth and rapid flow of vehicles into and out of same. Maximized parking density is attained together with minimization of structural cost and complexity while at the same time providing for highly efficient vehicle movement into and out of parking stalls. Various additions are possible and oftentimes advantageous in connection with the basic structure and system of FIGS. 5 and 6. Thus for example there are provided means for pedestrian movement throughout the system. Such may, for example, include an annular walkway 71 disposed about the rotary parking platform 58 of the intermediate level 54 together with radial extensions of such walkways 71 outwardly to elevators or escalators 72 between street level and the intermediate level 54. The upper or street level 56 is also preferably provided with a walkway 73 thereabout. A suitable provision may be made at the street level for control over pedestrians entrance and departure. A control station may be provided at street level, for example, whereat a vehicle owner upon returning for his parked vehicle may present his parking ticket or the like identifying the location of his car so that the control operator may then receive payment for parking and at the same time rotate the appropriate parking platform to align the desired parking stall with an exit either at the first or second levels. Provision may also be made for appropriately restraining parked vehicles from unintentional movement and of course in this and other embodiments of the present invention it is possible to provide for automatic fare collection as for example in the manner disclosed in my above-noted patent. It is also possible to provide for vehicle operator selection of the parking stall to be employed on the upper level of the unit and for vehicle operator control over calling a desired stall for removal of the vehicle from the parking platform.

What is claimed is:
1. A parking system including structure defining a plurality of vertically spaced parking levels and comprising
  a single annular parking platform rotatably mounted at each parking level and adapted for controlled rotary indexing,
  each of said platforms including a single annular row of radially directed parking stalls thereon and said platforms being controlled to index each stall into position for vehicle ingress and egress,
  a central spiral vehicle ramp extending through said structure within said platforms and having an opening at each parking level, and
  means defining vehicle driveways from said ramp to each of said platforms for movement of vehicles to and from parking platforms, said means defining vehicle driveway including at least one bridge extending across the center of a parking level from the ramp thereat to the opposite interior side of the parking platform at such level for movement of vehicles onto and off of the platform across the bridge.

2. The parking system of claim 1 further defined by said structure defining at least three parking levels having a rotary platform at each level, and one of said bridges being disposed at each level for ingress and egress of vehicles to and from said stalls.

3. The parking system of claim 2 further defined by a vehicle turntable disposed at each parking level at the bridge thereof for rotating vehicles 180° to reverse the direction of the vehicles on the bridge for facilitating vehicle movement in both directions along said ramp.

4. The parking system of claim 2 further defined by the rotary parking platforms at adjacent levels being radially staggered and platforms in alternate levels being vertically aligned, and a bridge extending from said ramp to the parking platform on at least alternate levels whereat the platforms are displaced radially outward from adjacent platforms.

5. The parking system of claim 1 further defined by a second spiral ramp extending about the exterior of said parking platforms for movement of vehicles in one direction while the central ramp accommodates movement in the opposite direction.

6. The parking system of claim 1 further defined by said structure defining two parking levels and a sublevel below said parking levels with ingress and egress means for said sublevel, said spiral ramp extending between said two parking levels and said sublevel, the parking platform on the top level being disposed radially outward of the parking platform on the middle level, means defining a driveway from the top of the ramp to the parking platform at the top level, means defining a vehicle egress directly from the parking platform at said top level and a second curved ramp extending from said middle level radially outward of the parking platform thereat downward to said sublevel for egress of vehicles from said middle level.

7. The parking system of claim 1 further defined by one of said bridges being disposed at each vertically spaced parking level and a vehicle turntable disposed on each of said bridges, said turntable comprising a solid planar circular structure with peripheral portions being substantially tangent to the rotatable parking platform for rotating vehicles to reverse the heading thereof so that vehicle movement across the bridges is always in a forward direction.

* * * * *